(12) United States Patent
Berube et al.

(10) Patent No.: US 8,764,895 B2
(45) Date of Patent: Jul. 1, 2014

(54) METALLIC DISPERSIONS FOR INKJET PRINTING

(75) Inventors: Gregory M. Berube, Nashua, NH (US); Darryl S. Williams, Groton, MA (US); Alexander I. Shakhnovich, Arlington, MA (US)

(73) Assignee: Cabot Corporation, Boston, MA (US)

( * ) Notice: Subject to any disclaimer, the term of this patent is extended or adjusted under 35 U.S.C. 154(b) by 340 days.

(21) Appl. No.: 13/284,343

(22) Filed: Oct. 28, 2011

(65) Prior Publication Data

US 2012/0105559 A1     May 3, 2012

Related U.S. Application Data

(60) Provisional application No. 61/438,491, filed on Feb. 1, 2011, provisional application No. 61/409,886, filed on Nov. 3, 2010.

(51) Int. Cl.
    *C09D 11/02*      (2014.01)

(52) U.S. Cl.
    USPC ........................... 106/31.64; 106/31.9

(58) Field of Classification Search
    CPC ............................. C09D 11/30; C09D 11/322
    USPC ............................................ 106/31.64, 31.9
    See application file for complete search history.

(56) References Cited

U.S. PATENT DOCUMENTS

| | | | |
|---|---|---|---|
| 7,749,299 B2 | 7/2010 | Vanheusden et al. | |
| 7,963,646 B2 | 6/2011 | Magdassi et al. | |
| 2005/0189520 A1 | 9/2005 | Okada et al. | |
| 2006/0130700 A1 | 6/2006 | Reinartz | |
| 2006/0264518 A1 | 11/2006 | Kato et al. | |
| 2009/0053415 A1* | 2/2009 | Isobe | 427/256 |

FOREIGN PATENT DOCUMENTS

| | | | |
|---|---|---|---|
| JP | 2003-306625 A | 10/2003 | |
| JP | 2005-507452 A | 3/2005 | |
| JP | 2008-524395 A | 7/2008 | |
| WO | WO2012009512 A2 | 1/2012 | |

OTHER PUBLICATIONS

International Preliminary Report on Patentability for PCT International Application No. PCT/US2011/057796, mailed on May 16, 2013.

* cited by examiner

*Primary Examiner* — Veronica F Faison

(57) ABSTRACT

A dispersion of silver particles and a method of making the dispersion and ink are described. The dispersion or ink may be an aqueous dispersion or ink and may produce silver images having improved properties such as an improvement in gloss.

7 Claims, 2 Drawing Sheets

METALLIC DISPERSIONS FOR INKJET PRINTING

CROSS REFERENCE TO RELATED APPLICATIONS

This patent application claims the benefit of U.S. Provisional Patent Application Nos. 61/438,491, filed Feb. 1, 2011 and 61/409,886, filed Nov. 3, 2010.

FIELD OF THE INVENTION

The present disclosure relates to dispersions of metal particles and, in particular, to metal particle dispersions and methods of making metal particle dispersions for use in inkjet inks.

BACKGROUND

Metal dispersions can be used in inkjet inks to print metallic images onto paper or other substrates. These metallic images can exhibit high reflectivity and gloss that may make these inks useful in applications that benefit from these properties. These inks can be silver based inks that are produced by suspending colloidal silver particles in a liquid vehicle suitable for ink jet printing.

SUMMARY

In one aspect, an inkjet composition is provided, the composition comprising a liquid vehicle including at least 10% water by weight, at least 0.1% by weight of metallic silver particles dispersed in the vehicle, and less than 100 mg/L, dissolved silver cations in the liquid vehicle. An image printed using the composition may exhibit a gloss value of greater than 550, as measured by ASTM test method D523-08 at 60°.

In another aspect, a method of making an inkjet composition is provided, the method comprising forming an aqueous silver particle dispersion in a liquid vehicle comprising at least 10% water, adding an anion to the dispersion that forms an insoluble compound with silver cations, and reducing the concentration of silver cations to less than 100 mg/L. The anion may be univalent anion and in some embodiments may be chloride, bromide or thiocyanate.

In another aspect, a method of making an inkjet composition is provided, the method comprising forming an aqueous silver particle dispersion in a liquid vehicle comprising at least 10% water and at least 0.1% silver particles by weight, and reducing the concentration of silver cations in the dispersion by more than 50%.

In another aspect, an image is applied to a substrate via jetting wherein the image comprises metallic silver and exhibits a gloss of greater than 550 gloss units.

DETAILED DESCRIPTION

Figure 1:
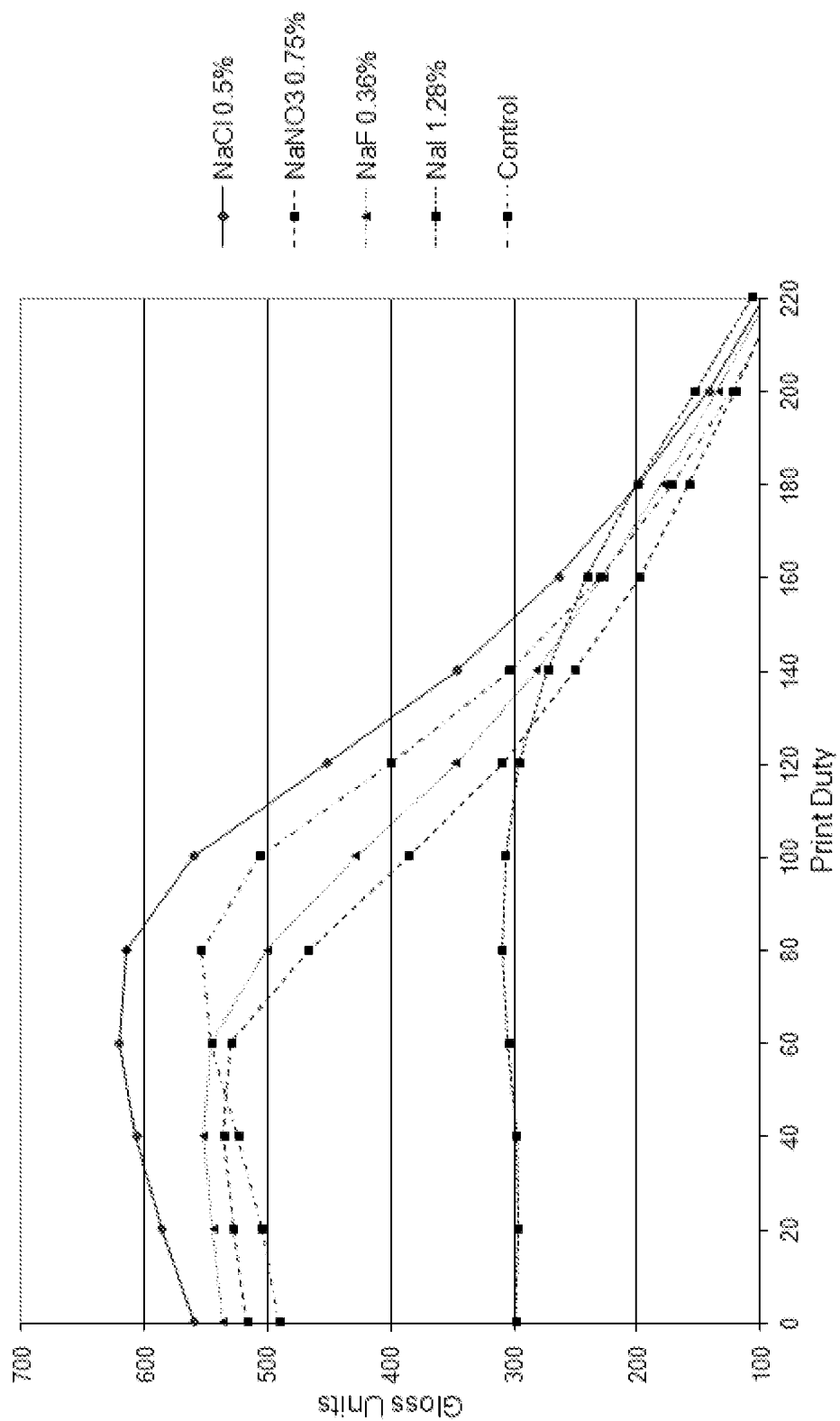
FIG. 1 is a graphical representation of the relationship between gloss units and print duty wherein equimolar amounts of various salts are added to a prepared ink.

In one aspect, an aqueous silver composition can be applied to a substrate via an inkjet system to provide an image exhibiting improved gloss values. The composition may be a concentrated dispersion designed to be worked up with an ink jet vehicle to produce an ink jet ink, or the composition may itself be a jettable ink jet ink. The composition may be an aqueous dispersion that can include colloidal metallic silver particles while including less than about 100 mg/L of silver cations in solution. By limiting the concentration of silver cations in the aqueous dispersion, the gloss value of the resulting printed silver image can be improved over similar dispersions that exhibit higher silver ion content. It is believed that the removal or sequestration of silver cations may help to decrease premature flocculation caused by these anions when the silver dispersion is jetted onto a substrate. This decrease in flocculation may result in a smoother surface which can provide for improved gloss values. It is also believed that in some cases removal or sequestration of silver cations may help reduce surface tension, which can further improve drop spreading and lead to a smoother print.

The dispersions may be aqueous dispersions and can include dispersed silver particles. The dispersions may have a soluble silver cation concentration of less than 300 mg/L, less than 200 mg/L, less than 100 mg/L, less than 50 mg/L, less than 20 mg/L or less than 10 mg/L. Silver ion concentration can be determined by, for example, ion specific electrode or by ICP spectroscopy.

Many aqueous silver dispersions suitable for inkjet use typically include silver cations at a concentration of greater than 100 mg/L, greater than 200 mg/L or greater than 300 mg/L $Ag^+$. Images printed from dispersions in which the silver ion concentration has been reduced have been shown to exhibit 60° gloss results that are improved by greater than 20, greater than 50, greater than 75 or greater than 100 gloss units over untreated dispersions. For example, gloss may improve from 400 to 500 or from 500 to 600 with the removal of most of the silver cations resident in the untreated dispersion. This improvement in 60° gloss has been demonstrated across a range of print densities with the greatest absolute gloss improvement coming at higher print densities. At these higher print densities, gloss improvement can exceed 100 gloss units, or about 20%. At lower print densities the improvement may be about 40 gloss units, hut due to lower gloss values at lower print densities, the percent increase may be 20% or greater.

The silver ion concentration in the dispersion can be reduced by more than 50%, more than 75%, more than 90%, more than 95% or more than 99% from the initial untreated silver ion concentration. Dispersed metallic silver particle concentration in the dispersion may be, for instance, greater than 0.1%, greater than 0.5%, greater than 1%, greater than 2%, greater than 5%, greater than 10%, greater than 20% or greater than 30% by weight.

The silver particles described herein may be produced using any method including, for example, the polyol process as described in U.S. Pat. No. 7,749,299, the contents of which are incorporated by reference herein. Silver dispersions may include dissolved silver cations regardless of the method of silver particle production. The concentration of these silver cations can be reduced by, for example, washing, leaching, diafiltration, ion adsorption, ion exchange, electrochemical precipitation or chemical precipitation. Silver cations may be physically removed from the dispersion or may be chemically altered, such as by the formation of an insoluble salt or the reduction of dissolved ions to metallic silver.

In one set of embodiments, silver ion concentration can be reduced by adding an anion that is capable of forming an insoluble compound with silver ions that may be present in the dispersion. As used herein, an insoluble silver compound is a compound having a solubility of less than 20 mg/L in water at 25° C. Some of the anions capable of forming insoluble compounds with silver ions include, for example, chloride, stearate, sulfide, bromide, cyanide, iodide, iodate, arsenate, azide, benzoate, oxalate, sulfite, carbonate phosphate, hydrogen phosphate, and thiocyanate. Not all anions that form insoluble silver compounds necessarily improve gloss results. For instance, it has been shown that in some cases the use of iodide can result in a reduction in gloss. This may be due to the oxidation of iodide to elemental iodine or iodate as a result of reacting with available silver cations.

Appropriate anions for treatment may include, for example, univalent anions that form insoluble silver compounds in the presence of silver cations. Univalent anions include, for example, chloride, bromide and thiocyanate. Anions may be provided in any form that allows the anions to react with silver cations in the aqueous dispersion. For example, anions may be provided in the form of soluble salts, acids or complexes, and may be added as solids or in solution. Examples of useful salts include those formed with counter ions from columns 1 and 2 of the periodic table. These cations include, for instance, potassium, sodium, calcium, magnesium and lithium. Specific salts include, for example, sodium chloride, sodium bromide, sodium thiocyanate, potassium chloride, potassium bromide and potassium thiocyanate. This list is not exclusive and those of skill in the art will readily be able to determine additional salts that can provide anions capable of forming insoluble salts with silver cations.

In some embodiments, salts or acids can be added to provide anion concentrations in the composition of greater than 5 mN, greater than 10 mN, greater than 15 mN, greater than 25 mN, greater than 50 mN, greater than 100 mN or greater than 500 mN. On a weight basis, these salts or acids can be provided at concentrations of greater than 50 mg/L, greater than 100 mg/L, greater than 500 mg/L, greater than 1000 mg/L, greater than 5000 mg/L or greater than 1.0% by weight. Anions can be provided at concentrations that can be determined stoichiometrically based on the measured or expected concentration of silver ions in a particular dispersion. In some cases, an excess concentration of anions can be used to provide a residual anion concentration capable of scavenging silver ions that may form after the initial silver ion concentration has been lowered. Insoluble silver salts that may be formed can be removed from the dispersion, such as by filtration, or may remain suspended in the dispersion. In some instances, the presence of these insoluble species does not interfere with the quality of the resulting printed image. In silver dispersion production processes that include filtration, such as diafiltration, silver ions may be removed from solution before or after the dispersion has been filtered and/or concentrated.

As used herein, an aqueous dispersion includes a liquid vehicle in which at least 10% of the liquid vehicle is water. The silver particles may be dispersed in a liquid vehicle where the liquid fraction of the dispersion includes greater than 50%, greater than 75%, greater than 90% or greater than 95% water by weight. The dispersions may be essentially free of non-aqueous solvents. These stable aqueous dispersions may be used, for example, to produce inks capable of depositing metallic silver on a substrate via an inkjet printer. The vehicle may include aqueous compatible additives such as polyalcohols, surfactants, dispersants, pH buffers, and preservatives. Surfactants may include, for example, hydroxythioethers such as Envirogem® 360 (Air Products). The aqueous vehicle may also include for instance, water-soluble co-solvents or humectants such as, for example, alcohols, ketones, ketoalcohols, ethers, sulfones, sulfoxides, lactones and lactams; glycerol and derivatives thereof; glycols such as ethylene glycol, and tetraethylene glycol, triethylene glycol monobutyl ether, diethylene monobutyl ether, propylene glycol, di- and tri-propylene trimethylene butylene hexylene glycol and thiodiglycol; addition polymers of oxyethylene or oxypropylene such as polyethylene glycol, polypropylene glycol and the like; mono- and di-alkyl ($C_1$-$C_4$) ethers of mono-, di- and tri-ethylene glycol and mono-, di- and tri-propylene glycols; linear or branched $C_4$-$C_8$ diols and triols.

The silver particles and dispersions used herein may initially be obtained using any source or technique capable of providing silver particles of desired size. Silver particles may be formed by methods known to those of skill in the art using, for instance, precipitation methods such as the polyol process. In this process, dissolved silver ions can be reduced to metallic silver particles in a polyol such as ethylene glycol in the presence of a vinyl pyrrolidone polymer, such as vinyl pyrrolidone homopolymer (PVP). This process is described fully U.S. Pat. No. 7,749,299, which is hereby incorporated by reference herein. Initially produced dispersions may have an average particle size of less than 200 nm, less than 150 nm, less than 100 nm, less than 75 inn, less than 50 nm, or less than or equal to 25 nm. Unless otherwise stated, the silver particle sizes provided herein are determined by CPS disc centrifugation.

WORKING EXAMPLES

Example 1

To evaluate the improvement in gloss when a silver dispersion is treated for the removal or sequestration of silver ions, an ink sample was produced as described below. The concentrated silver dispersion (30.12% silver by weight) was produced using the PVP/diafiltration process described in PCT Application No. PCT/US11/43969, which is incorporated by reference herein. For Sample 1, sodium thiocyanate was added to the dispersion to provide a level of 0.14% NaSCN by weight in the dispersion (0.28 g, or 0.24 mN $SCN^-$).

| Dispersion Component | Quantity |
| --- | --- |
| Diethylene glycol monobutyl ether | 1.60 g |
| Glycerol: | 1.60 g |
| Envirogem 360 (supplied by Air Products): | 0.020 g |
| Silver dispersion (30.12% dispersion) | 1.60 g |
| Water | 15.18 g |

Comparative Example

A comparative sample (1C) was made by reproducing the ink of Example 1 without the addition of sodium thiocyanate.

Each of the experimental inks was printed using an Epson C-88 printer onto Epson premium glossy paper. Inks were printed at maximum duty swatch. Unless otherwise stated, all gloss results reported herein were 60° gloss results obtained using a Micro Tri-Gloss instrument as detailed in ASTM test method D523-08 (at 60°). Results for samples 1 and 1C were as follows and are provided in gloss units:

Sample 1: 647

Comparative Sample 1C: 490

In this case, the addition of an anion capable of forming an insoluble salt with silver cations resulted in an ink providing an increased gloss reading of more than 150 gloss units, or greater than 30%.

Example 2

In a second set of experiments, the ink of Example 1 was prepared and equimolar amounts of various salts were added after formulation of the ink and before printing. Concentrations are provided on a weight to weight basis. The salts included univalent ions that are known to precipitate silver, univalent ions that don't precipitate silver, multivalent ions that precipitate silver and multivalent ions that don't precipitate silver. Printing was performed on an Epson C-88 printer by loading the ink into one of the ink cartridges and using the standard printing settings to print multiple swatches at various print duties. The prints were printed on Epson Premium Photo Paper. In Table 1 below, the gloss is reported at the maximum duty swatch. Results at different print duties are provided graphically in FIG. 1. Chloride ions provided the greatest improvement in gloss. It is believed that this is the result of sequestration of silver ions due to the formation of insoluble silver chloride. Neither nitrate nor fluoride form insoluble salts with silver. Iodide precipitates silver ions to form silver iodide. The gloss value for the ink including sodium iodide is significantly lower than the control and is lower than values provided by other anions that are known to precipitate silver. It is believed that silver ion is a strong enough oxidizer to oxidize iodide to iodine, which is a brown solid that can interfere with the gloss provided by metallic silver. Carbonate is a divalent anion that precipitates silver by forming insoluble silver carbonate. In this experiment, the sodium carbonate caused the ink to become unstable, precipitating out the colloid and resulting in an unprintable ink. This may be the result of ink instability due to the stronger electrolytic effect of divalent anions compared to monovalent anions.

TABLE 1

| Sample ID | Additive Concentration | Gloss Result (ASTM D523) |
|---|---|---|
| Control 2C | None | 491 |
| 3 | 0.5% NaCl | 560 |
| 4 | 0.75% NaNO$_3$ | 517 |
| 5 | 0.36% NaF | 537 |
| 6 | 1.28% NaI | 299 |
| 7 | 0.90% Na$_2$CO$_3$ | NA |

Example 3

Figure 2:
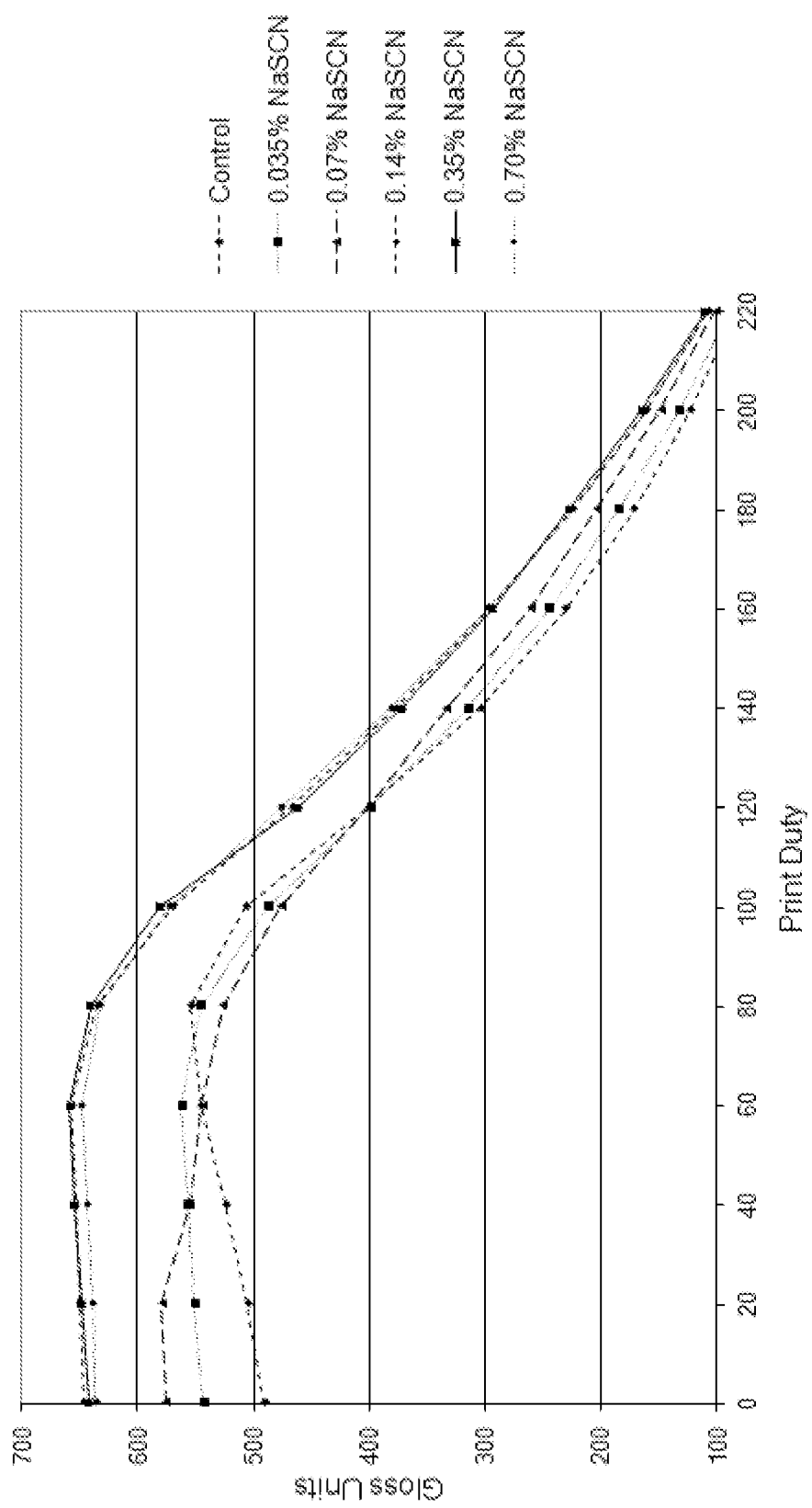
FIG. 2 is a graphical representation of the relationship between gloss units and print duty wherein various amounts of NaSCN are added to a prepared ink.

In a third set of experiments, various amounts of thiocyanate, as sodium thiocyanate, were added to the ink of Example 1. These inks were then printed at different print duties and the gloss values were recorded. Results are provided in graphical form in FIG. 2 and results at maximum duty swatch are provided below in Table 2. Results indicate that significant gloss improvement is realized at greater than or equal to about 0.035% sodium thiocyanate in the ink. Results also show that gloss improvement levels out, or decreases slightly, at greater than about 0.14% sodium thiocyanate.

TABLE 2

| Sample | NaSCN Concentration | Gloss Result (ASTM D523) |
|---|---|---|
| Control 2C | 0.000% | 491 |
| 8 | 0.035% | 543 |
| 9 | 0.070% | 576 |
| 10 | 0.14% | 647 |
| 11 | 0.35% | 642 |
| 12 | 0.70% | 637 |

Example 4

In another set of experiments, chloride salts of varying cations were added to the ink at equivalent molar concentrations and gloss values were measured. In addition, sodium bromide was also tested. An additional sample (17) included 1.0% sodium chloride as well as 1.0% polyvinylpyrolidone (PVP) (K-15 available from ISP). In sample 18, an ink was produced from a silver dispersion where sodium chloride had been added to the silver dispersion during the silver dispersion production process. Specifically, 5.0% NaCl was added to the silver dispersion before diafiltering, as described PCT Application No. PCT/US11/43969, which is incorporated by reference herein. Inks (Sample 18) made from this dispersion resulted in a gloss value of 581.

Results are provided for maximum duty swatch for each ink in Table 3, below. Each sample provided improved gloss results when compared to the control 2C (Table 2). Bromide appeared to provide better gloss results than an equivalent molar concentration of chloride. For the chloride salts, the specific cation appeared to have an effect, with lithium chloride providing the best results among the chloride salts. The addition of PVP improved gloss results when compared to the use of sodium chloride alone. The addition of sodium chloride to the silver dispersion prior to ink formulation provided an ink having a gloss value greater than that of the control, but lower than those inks in which the salt was added during ink formulation.

TABLE 3

| Sample | Additive Concentration | Gloss Result (ASTM D523) |
|---|---|---|
| 13 | 0.88% NaBr | 639 |
| 14 | 0.64% KCl | 562 |
| 15 | 0.36% LiCl | 611 |
| 16 | 1.0% NaCl | 581 |
| 17 | 1.0% NaCl, 1.0% PVP | 602 |
| 18 | 5.0% NaCl added to silver dispersion during silver production process | 581 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. An inkjet composition comprising:
   a liquid vehicle including at least 10% water by weight;
   at least 0.1% by weight of metallic silver particles dispersed in the vehicle; and
   less than 100 mg/L dissolved silver cations in the liquid vehicle.

2. The inkjet composition of claim 1 comprising greater than 5% by weight of metallic silver particles.

3. The inkjet composition of claim 1 comprising less than 10 mg/L silver cations.

4. The inkjet composition of claim 1 wherein the vehicle comprises greater than 50% water by weight.

5. The inkjet composition of claim 1 wherein the average silver particle size (mean volume) is less than or equal to 50 nm measured by disc centrifuge.

6. The inkjet composition of claim 1 wherein the composition is an inkjet dispersion.

7. The inkjet composition of any of claim 1 wherein the composition is an inkjet ink.

* * * * *